United States Patent
Rosenbaum

(10) Patent No.: US 7,236,937 B2
(45) Date of Patent: Jun. 26, 2007

(54) METHOD FOR CONSIGNING ORDERED COMMODITIES

(75) Inventor: Walter Rosenbaum, Paris (FR)

(73) Assignee: Siemens Dematic AG, München (DE)

( * ) Notice: Subject to any disclaimer, the term of this patent is extended or adjusted under 35 U.S.C. 154(b) by 1093 days.

(21) Appl. No.: 10/069,051

(22) PCT Filed: Jun. 25, 2001

(86) PCT No.: PCT/DE01/02286

§ 371 (c)(1),
(2), (4) Date: Feb. 21, 2002

(87) PCT Pub. No.: WO02/01429

PCT Pub. Date: Jan. 3, 2002

(65) Prior Publication Data

US 2002/0128927 A1    Sep. 12, 2002

(30) Foreign Application Priority Data

Jun. 27, 2000 (DE) .............................. 100 31 202

(51) Int. Cl.
G06F 9/46 (2006.01)
(52) U.S. Cl. .............................. 705/7; 705/26; 705/28
(58) Field of Classification Search ..................... 705/7
See application file for complete search history.

(56) References Cited

U.S. PATENT DOCUMENTS

| 5,319,542 | A | * | 6/1994 | King et al. ..................... 705/27 |
| 5,450,317 | A |   | 9/1995 | Lu et al. |
| 5,666,493 | A | * | 9/1997 | Wojcik et al. ................. 705/26 |
| 5,758,329 | A | * | 5/1998 | Wojcik et al. ................. 705/28 |
| 5,870,715 | A |   | 2/1999 | Belitz et al. |
| 5,890,136 | A | * | 3/1999 | Kipp ........................... 705/22 |
| 5,970,475 | A | * | 10/1999 | Barnes et al. ................. 705/27 |
| 5,991,739 | A | * | 11/1999 | Cupps et al. ................. 705/26 |
| 6,029,140 | A |   | 2/2000 | Martin et al. |
| 6,085,170 | A | * | 7/2000 | Tsukuda ....................... 705/26 |

(Continued)

FOREIGN PATENT DOCUMENTS

EP    0 724 490 B1    8/1996

OTHER PUBLICATIONS

"American Is Upgrading Transportation System", Supermarket News, v45, n40, Oct. 2, 1995.*

(Continued)

Primary Examiner—Romain Jeanty

(57) ABSTRACT

To dispatch ordered articles order data is transferred from a customer to a supplier of the articles. A dispatch center of a common dispatch service is notified of the earliest possible outward delivery time for each supplier. This information is saved in a database at the dispatch service. The latest of the earliest possible arrival times of the articles at the dispatch center is determined, wherein each arrival time is calculated by adding the respective transport time to the earliest possible outward delivery time. The dispatch service notifies each supplier of the outward delivery time to be achieved, which is obtained from the latest of the earliest possible arrival times at the dispatch center minus the respective transport time from the supplier to the dispatch center. The suppliers send out the ordered articles to the dispatch center at the notified times, and the articles are forwarded together to the customer.

9 Claims, 3 Drawing Sheets

U.S. PATENT DOCUMENTS

Figure 1:
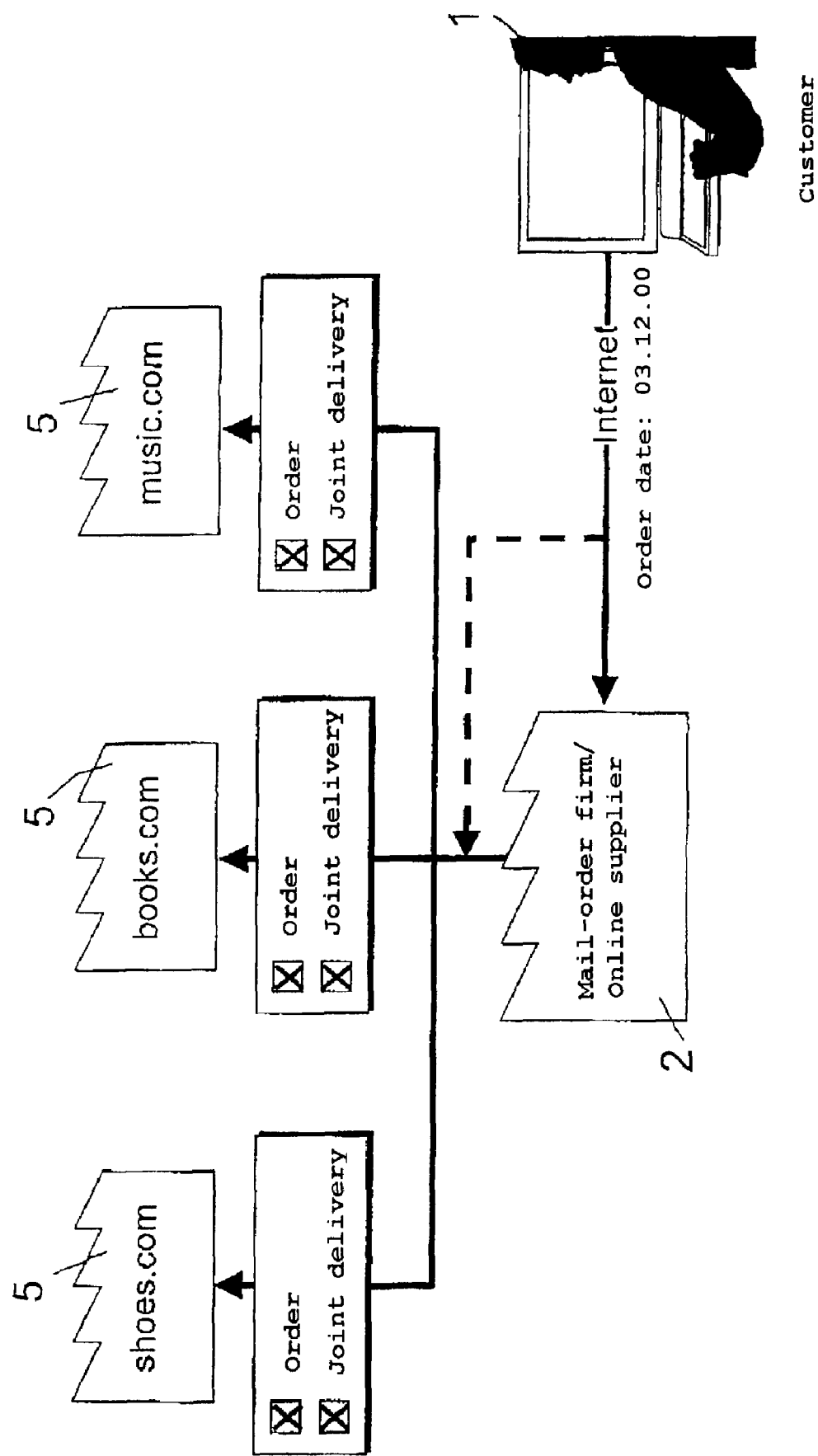

| | | | |
|---|---|---|---|
| 6,725,222 B1* | 4/2004 | Musgrove et al. | 707/10 |
| 6,980,963 B1* | 12/2005 | Hanzek | 705/26 |
| 6,993,572 B2* | 1/2006 | Ross et al. | 709/218 |
| 2001/0013007 A1* | 8/2001 | Tsukuda | 705/8 |
| 2001/0037252 A1* | 11/2001 | Kawakatsu | 705/26 |
| 2001/0042024 A1* | 11/2001 | Rogers | 705/26 |
| 2001/0047306 A1* | 11/2001 | Garretson | 705/26 |
| 2002/0046173 A1* | 4/2002 | Kelly | 705/50 |
| 2002/0188702 A1* | 12/2002 | Short et al. | 709/220 |
| 2004/0002903 A1* | 1/2004 | Stolfo et al. | 705/26 |
| 2005/0038758 A1* | 2/2005 | Hilbush et al. | 705/402 |

OTHER PUBLICATIONS

Hall et al (Scheduling With Fixed Delivery Dates), 2/12001, Department of Management Sciences, Fisher College of Business, The Ohio State University, Columbia, Ohio 43210-1144, pp. 134-144.*

* cited by examiner

METHOD FOR CONSIGNING ORDERED COMMODITIES

The invention concerns a method for the dispatch of ordered articles, in which different articles are ordered from a mail-order firm or online supplier, and in which the order data and customer details, such as name and address, are saved in a database.

If a customer orders different goods from one or more online suppliers, then at present he receives consignments from each manufacturer/supplier, i.e. he must be present to receive the goods on more than one occasion, and the transport costs are relatively high.

If appropriate goods are ordered from a conventional mail-order firm, then unless they are sent out directly from the manufacturers to the customer, they are stored temporarily in a large warehouse. Either the goods are held in this warehouse temporarily in the quantities and product range required in order to enable goods to be taken directly from there when orders are received, or goods for new orders are held there temporarily until all articles are present. The goods are then sent in a joint shipment to the customer. The latter temporary storage option does require less warehousing space, but this can vary significantly from day to day, so that extra capacity must be kept in reserve. In addition, the full infrastructure also needs to be in place for this option.

The object of the invention stated in claim 1 is therefore to create a method for the dispatch of different articles that have been ordered, in which the necessary temporary storage capacities are reduced compared with the prior art when a joint delivery is required.

The invention is based on the idea of coordinating the outward delivery times from the manufacturers/suppliers, and at the same time including the transport from the respective manufacturer/supplier to the dispatch service as a form of quasi-storage, such that a larger temporary warehouse is no longer needed in order to provide the customer with the ordered articles in a single delivery.

This is achieved by a common dispatch service being notified of the earliest possible outward delivery times for each of the manufacturers/suppliers, this information being saved there in a database together with the order data and customer details, such as name, address. Then the latest arrival time of articles at the dispatch center of the dispatch service is determined for this order, which is calculated by adding the respective transport times onto the associated earliest possible delivery times from the manufacturers/suppliers. The earliest possible delivery time to the customer is then calculated by adding the transport time from the dispatch center to the customer onto the latest arrival time at the dispatch center, and then adding onto this a handling time at the dispatch service.

After that, each manufacturer/supplier for the order concerned is notified by the dispatch service of the outward delivery time to be achieved. This is obtained from the latest arrival time at the dispatch center minus the respective transport time from the manufacturer/supplier to the dispatch center. Finally, the ordered articles are sent out to the dispatch service at the notified times, and then forwarded jointly from the dispatch center to the customer.

Advantageous embodiments of the invention are presented in the sub-claims.

In order to avoid the customer being absent when the articles are delivered, it is advantageous to agree the delivery date with him. To this end, the earliest possible delivery time to the customer is determined by adding the transport time between the dispatch center and the customer onto the latest arrival time and then adding onto this a handling time at the dispatch center. Then at least one delivery time is proposed to the customer. Once the confirmed delivery time has been received from the customer, the outward delivery times to be achieved by the manufacturers/suppliers are postponed, on the basis of the earliest possible delivery time to the customer, by the time difference between the confirmed and the earliest possible delivery time.

In an advantageous embodiment, the dispatch service is notified of the transport times between the manufacturers/suppliers and the dispatch center, together with the earliest possible outward delivery times, and the information saved in the database.

In a further advantageous embodiment for determining the current transport times between manufacturers/suppliers and dispatch center, these times are calculated, saved and statistically analyzed on a continuous basis.

It is advantageous for the customer if he is directed to several sub-online suppliers via just one online supplier, which co-ordinates the dispatch at the same time.

In order to avoid excessive delivery delays, the earliest outward delivery times of the articles from the manufacturers/suppliers are advantageously compared with each other. Where a set time difference is exceeded, the articles are not delivered together to the customer.

In a further advantageous embodiment, the sizes and characteristics of the articles are also saved in the database at the dispatch service, and can be used if required to check whether the articles can be sent in one parcel. If several manufacturers/suppliers are available for a specific article, then it is advantageous to select these on the basis of the shortest possible transport distances to the customer and/or the earliest possible outward delivery times.

It is also advantageous if the customer can select the dispatch service.

The invention is explained in more detail below in a practical example with reference to the drawing, in which:

FIG. 1 shows a block diagram of the order process

Figure 2:
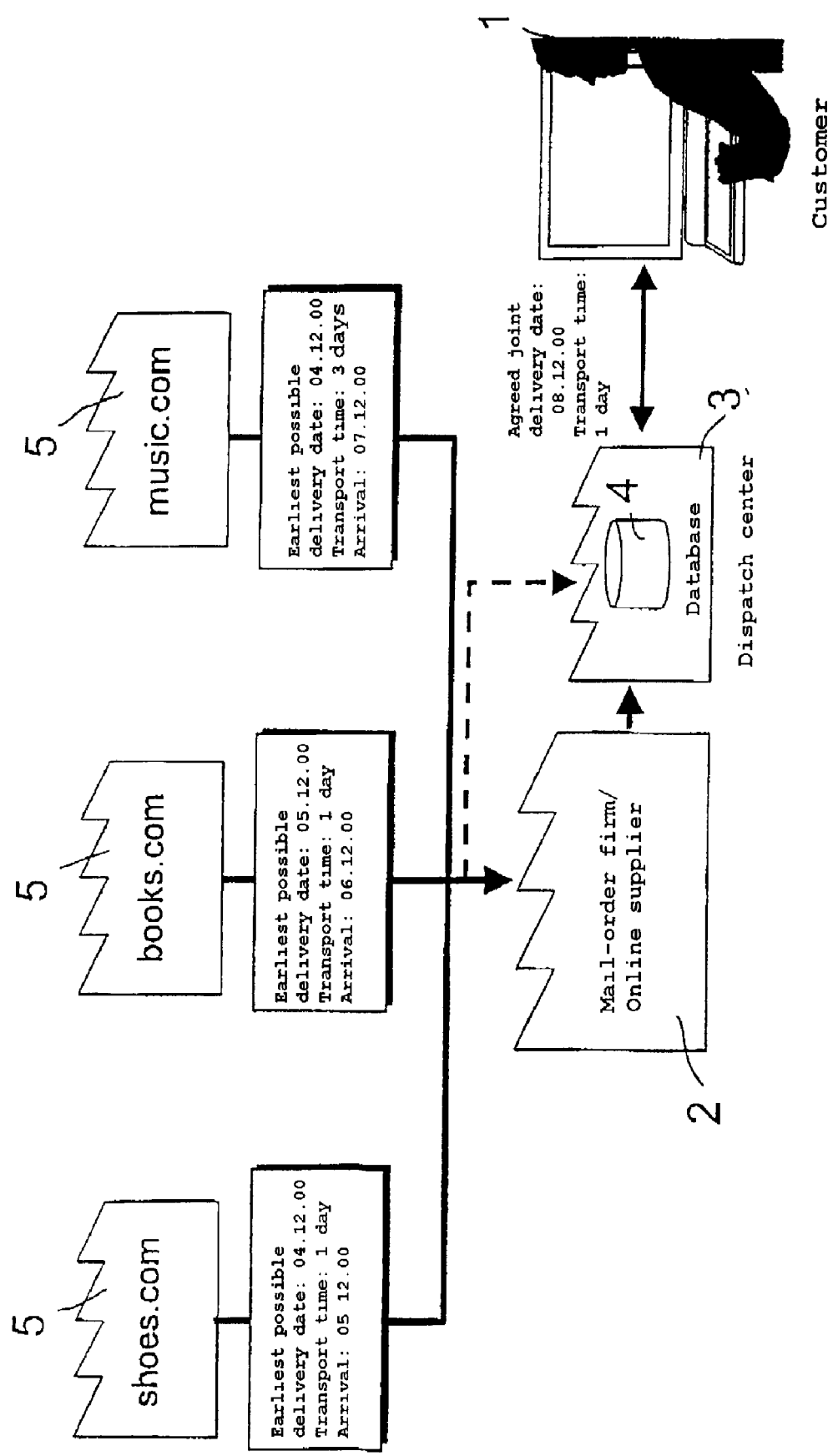
Figure 3:
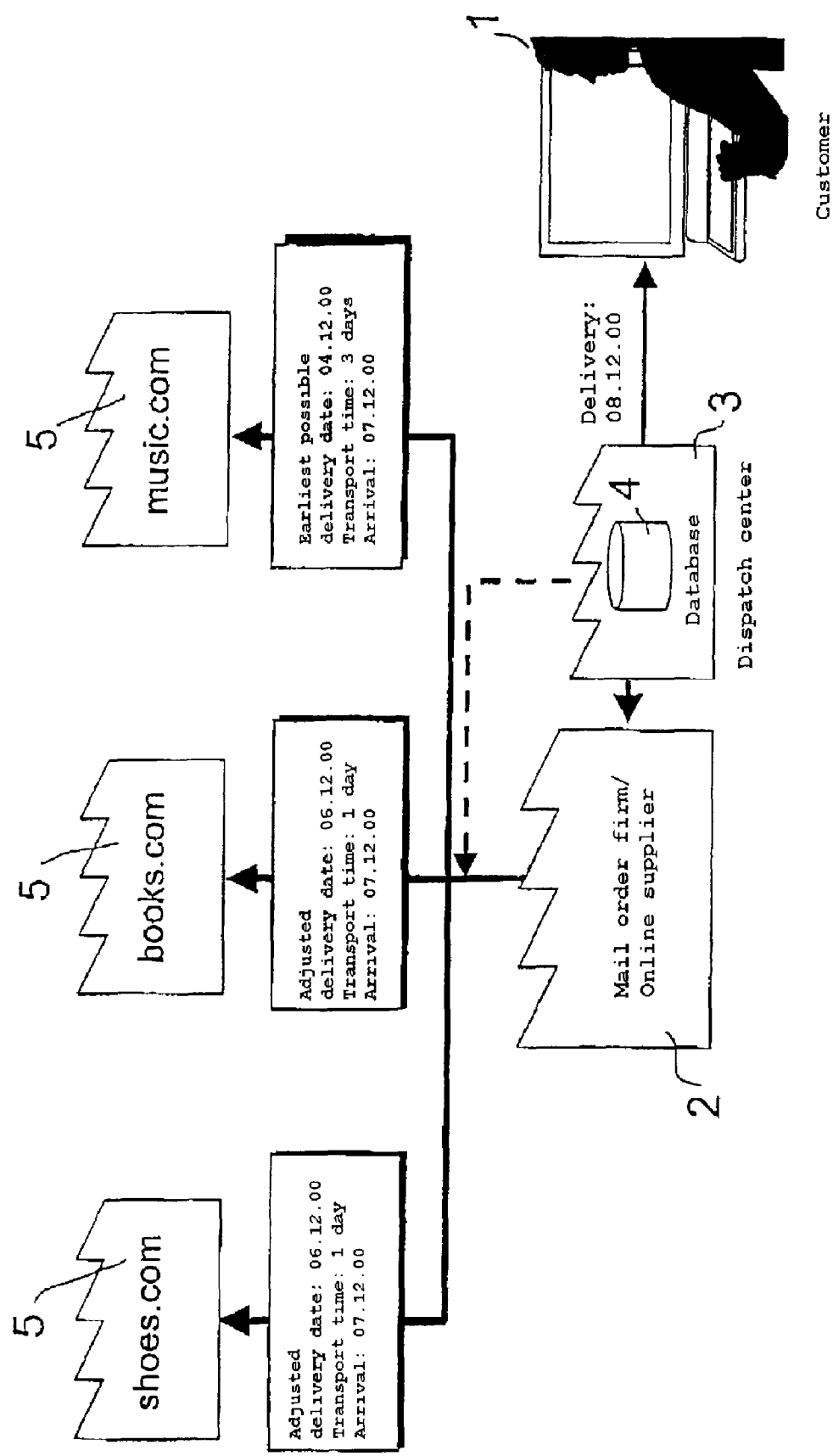

FIG. 2 shows a block diagram of the determination of the agreed delivery date to the customer FIG. 3 shows a block diagram of the information flow during the delivery process As shown in FIG. 1, the customer 1 places an order over the Internet with an online supplier 2 for shoes, books and music CDs on Mar. 12, 2000. The online supplier forwards this order to relevant manufacturers/suppliers 5. In addition, the customer 1 has chosen to receive the articles in a joint delivery. The dashed arrow indicates that the customer 1 can also order the goods directly from the manufacturers/suppliers 5, in this case over the Internet, as suggested by the names shoes.com, books.com and music.com. The manufacturers/suppliers 5 then determine their earliest possible delivery date and pass this information on to the dispatch center 3 of the online supplier 2 or of the selected dispatch service, where the data is saved in a database 4 together with the order data and customer details, such as name and address.

The transport times from the manufacturers/suppliers 5 to the dispatch center 3 are also saved with this data. The transport times may be notified by the manufacturers/suppliers 5, as shown, or this information is already saved in the database 4. The continuous arrow indicates that the dispatch service or dispatch center 3 belongs to the mail-order firm/online supplier 2, and receives the, information via there, while the dashed arrow indicates that the dispatch service is independent and obtains the information directly from the manufacturers/suppliers 5. The latest of the earliest possible arrival times at the dispatch enter 3 of the dispatch service (Jul. 12, 2000) is determined from the earliest possible delivery dates plus the respective transport times to the dispatch center 3 (shoes.com: Apr. 12, 2000 plus 1 day; books.com: May 12, 2000 plus 1 day; music.com: Apr. 12, 2000 plus 3 days). If one then adds the transport time to the customer 1 (1day) and a handling time (0 days in this case) at the dispatch service, then one obtains the earliest delivery time to the customer 1 (Aug. 12, 2000). It is advantageous to agree this date with the customer 1, so that he can actually receive the consignment. If this is done, then the joint arrival date of the ordered articles at the dispatch center 3 (Jul. 12, 2000) is determined by starting with the agreed date (the proposed date of Aug. 12, 2000 was confirmed) and subtracting the handling time and the transport time between customer 1 and dispatch center 3. As shown in FIG. 3, the respective transport times to the manufacturers/suppliers 5 are then deducted in order to determine the adjusted outward delivery times (Shoes.com: Jun. 12, 2000; books.com: Jun. 12, 2000; music.com: Apr. 12, 2000) that will guarantee arrival at the dispatch center 3 on the same date. The manufacturers/suppliers 5 are then notified of these outward delivery times, so that when these outward delivery times are achieved, temporary storage is no longer required to complete the consignment for the customer. The dashed arrow indicates that the data can also be transferred separately to independent manufacturers/suppliers. It is convenient if a single online supplier 2 linked to further online suppliers/manufacturers 5 co-ordinates the dispatch. In order to avoid delivery times to the customer that are too late, the earliest possible outward delivery times for the manufacturers/suppliers 5 are compared. Where a set time difference is exceeded, the articles are not sent jointly to the customer. If characteristics and dimensions of the articles are also recorded in the database 4, then if required one can find out whether the ordered articles can be sent in one parcel. Where there is a choice of several manufacturers/suppliers 5, they are selected on the basis of the shortest possible transport distances.

The invention claimed is:

1. A method for the dispatch of ordered articles, comprising:

ordering of different articles from a mail-order firm or one or more online suppliers by a customer;

storing relevant order data and customer details including name and address in a database of a dispatch center of a dispatch service, wherein the dispatch service is configured to coordinate outward delivery times from the manufacturers/suppliers to achieve delivery of the different articles to the customer in one shipment;

transferring or forwarding the order data from the customer in question to the relevant manufacturers/suppliers of the requested articles;

notifying the dispatch center of the dispatch service of the earliest possible outward delivery time $t_{OutM}$ for each of the manufacturers/suppliers, and storing the earliest possible outward delivery time $t_{OutM}$ under the respective article number in the database at the dispatch service;

determining the latest of the earliest possible arrival times of the articles at the dispatch center $t_{ArrD}$, each arrival time being calculated by adding the respective transport time $t_{TransMD}$ to the earliest possible outward delivery time $t_{OutM}$;

the dispatch service notifying each manufacturer/supplier for the order concerned of the outward delivery time to be achieved, which is obtained from the latest of the earliest possible arrival times at the dispatch center $t_{ArrD}$ minus the respective transport time from the manufacturer/supplier to the dispatch center;

determining an earliest possible delivery time $t_{DelC}$ to the customer by adding the transport time between dispatch center and customer $t_{TransDC}$ onto the latest arrival time $t_{ArrD}$, and then adding a handling time at the dispatch service;

the manufacturers/suppliers sending out the ordered articles to the dispatch center at the notified times; and forwarding the different articles in one shipment to the customer so that the customer receives the shipment at the determined earliest possible delivery time $t_{DelC}$.

2. The method as claimed in claim 1, further comprising:

the dispatch service notifying the customer of at least one proposal $Pt_{DelC} \geq t_{DelC}$ for the delivery time, for confirmation;

the customer notifying the dispatch service of the confirmed delivery time $C_{tDelC}$; and postponing the outward delivery times to be achieved by the manufacturers/suppliers on the basis of the earliest possible delivery time to the customer, by the time difference between the confirmed and the earliest possible delivery time.

3. The method as claimed in claim 1, wherein the dispatch service is notified of the transport times $t_{TransMD}$ between the manufacturers/suppliers and the dispatch center, together with the earliest possible outward delivery times $t_{OutM}$, and the information saved in the database.

4. The method as claimed in claim 1, wherein in order to determine the current transport times $t_{TransMD}$ between manufacturer/supplier and dispatch center, these times are calculated, saved and statistically analyzed on a continuous basis.

5. The method as claimed in claim 1, wherein a single online supplier, which co-ordinates the dispatch, leads to several sub-online suppliers.

6. The method as claimed in claim 1, wherein the earliest outward delivery times of the articles from the manufacturers/suppliers are compared with each other, and where a set time difference between the earliest outward delivery times is exceeded the articles are not sent jointly to the customer.

7. The method as claimed in claim 1, wherein the size of the articles and their characteristics are also saved in the database, if required this information is checked in order to ascertain whether these articles can be sent in one parcel, and they are dispatched in one parcel if a positive result is obtained from the check.

8. The method as claimed in claim 1, wherein where there are several possible manufacturers/suppliers for a specific article a selection is made on the basis of the shortest possible transport distances to the customer and/or the earliest possible outward delivery times.

9. The method as claimed in claim 1, wherein the customer selects the dispatch service.

* * * * *